United States Patent [19]

Nakatsuka

[11] Patent Number: 5,265,174
[45] Date of Patent: Nov. 23, 1993

[54] PATTERN RECOGNITION APPARATUS

[75] Inventor: Tadanori Nakatsuka, Machida, Japan

[73] Assignee: Canon Kabushiki Kaisha, Tokyo, Japan

[21] Appl. No.: 26,104

[22] Filed: Mar. 1, 1993

Related U.S. Application Data

[63] Continuation of Ser. No. 825,800, Jan. 21, 1992, abandoned, which is a continuation of Ser. No. 487,376, Mar. 2, 1990, abandoned.

[30] Foreign Application Priority Data

Mar. 3, 1989 [JP] Japan .................................. 1-50143

[51] Int. Cl.⁵ .............................................. G06K 9/00
[52] U.S. Cl. ........................................ 382/38; 382/13; 382/62
[58] Field of Search .................... 382/13, 7, 38, 62, 57

[56] References Cited

U.S. PATENT DOCUMENTS

| Re. 31,692 | 10/1984 | Tyburski et al. | 382/7 |
| 3,876,981 | 4/1975 | Welch | 382/62 |
| 4,032,887 | 6/1977 | Roberts | 382/62 |
| 4,040,009 | 8/1977 | Kadota et al. | 340/146.3 |
| 4,589,142 | 5/1986 | Bednar | 382/38 |
| 4,680,804 | 7/1987 | Kuzunuki et al. | 382/13 |
| 4,876,735 | 10/1989 | Martin et al. | 382/62 |

Primary Examiner—Leo H. Boudreau
Attorney, Agent, or Firm—Fitzpatrick, Cella, Harper & Scinto

[57] ABSTRACT

An apparatus for recognizing characters or patterns from handwritten information. The apparatus is provided with plural methods of recognition, and a suitable method of recognition is selected according to the requirement of the user for recognizing the handwritten information.

6 Claims, 6 Drawing Sheets

| NO. OF STROKES | CHR CODE | COORDINATES OF FEATURE POINTS |
|---|---|---|
| 8 | 3671 | (30, 79), (31, 60), (31, 40) ⋮ |

| BASIC STROKE CODE | SHAPE | BASIC STROKE CODE | SHAPE |
|---|---|---|---|
| 1 | → | 6 | ↖ |
| 2 | ↘ | 7 | ↑ |
| 3 | ↓ | 8 | ↗ |
| 4 | ↙ | 9 | ⌐ |
| 5 | ← | 10 | ∟ |
| | | | |

FIG. 5

| NO. OF STROKES | CHR CODE | BASIC STROKE CODE TRAIN |
|---|---|---|
| 8 ⋮ | 3671 ⋮ | 3(↓), 9(↘), 1(→), ⋯ |

FIG. 6

FEATURE POINT PATTERN MATCHING — 60

FIG. 7

BASIC STROKE — 70

FIG. 10

FIRST METHOD     SECOND METHOD

| BASIC STROKE | FEATURE POINT | RE-RECOGNITION |
|---|---|---|
| 101 | 102 | 103 |

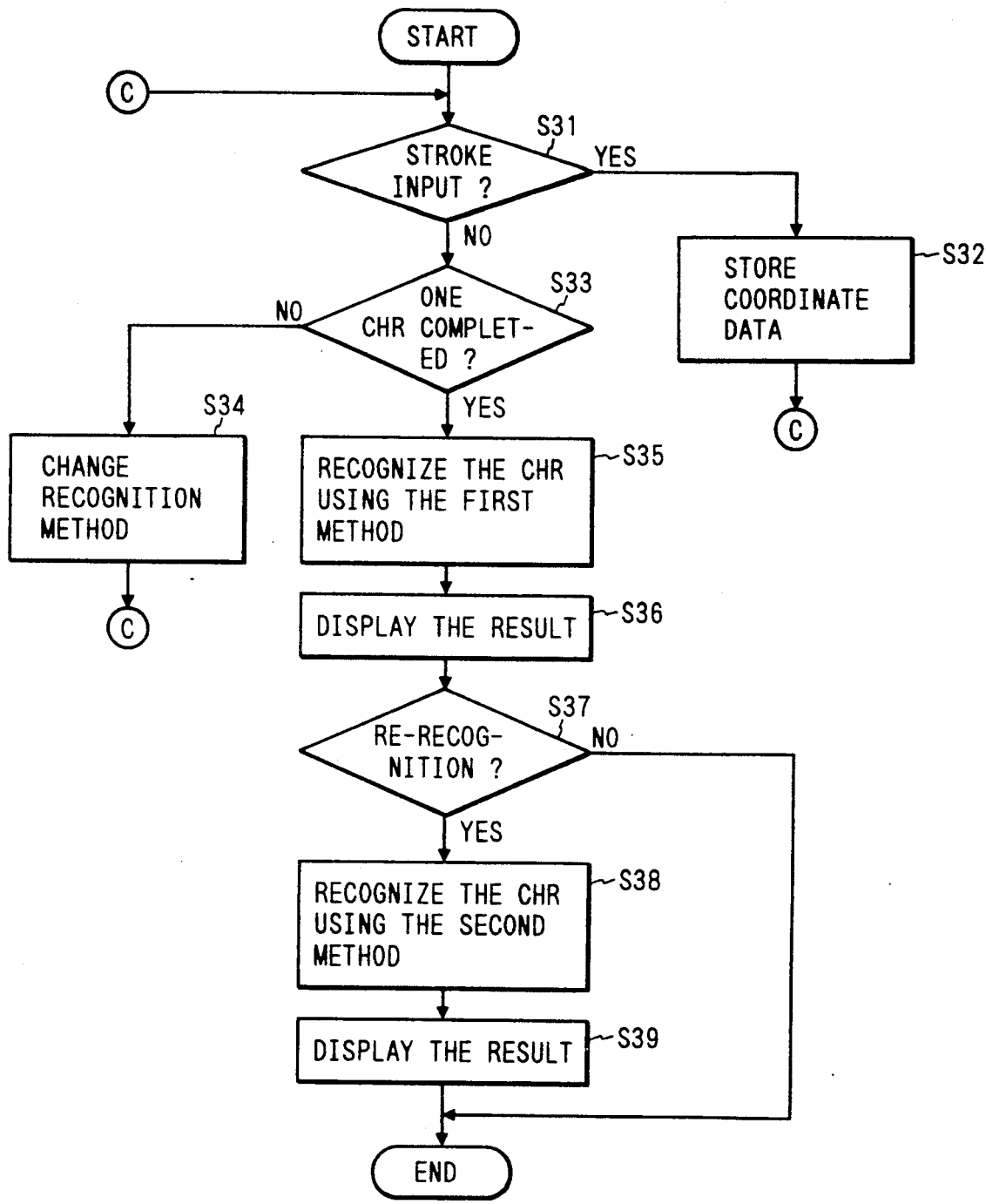

PATTERN RECOGNITION APPARATUS

This application is a continuation of application Ser. No. 07/825,800, filed on Jan. 21, 1992, now abandoned, which is a continuation of prior application Ser. No. 07/487,376 filed on Mar. 2, 1990, now abandoned.

BACKGROUND OF THE INVENTION

1. Field of the Invention

The present invention relates to a pattern recognition apparatus for recognizing characters or patterns from handwritten information representing handwriting.

2. Related Background Art

As general processing methods used in such apparatus, for example an on-line character recognition apparatus, there are already known the feature point pattern matching method and the basic stroke method. Said feature point pattern matching method consists of extracting at least three feature points representing each stroke of handwriting from the up/down information and x, y-coordinates of the pen entered from a tablet, determining the similarity with standard patterns registered in a dictionary, and providing a pattern of highest similarity as the result of recognition. The similarity is defined by the reciprocal of the sum of distances between the corresponding feature points of the entered character and the standard pattern.

On the other hand, the basic stroke method consists of approximating the strokes constituting a character by a group of vectors quantized in eight directions, classifying said vectors into certain basic strokes, and recognizing a character from the combination of said basic strokes.

These methods have following advantages and disadvantages:

1) The feature point pattern matching method is resistant to deformation of patterns, but requires a long recognition time. A very long recognition time is required if the sequential order of handwriting of a character is not specified.

2) The basic stroke method requires a shorter recognition time, but is weak to deformations such as characters with a strong personal touch or continuedly written characters, or a change in the sequential order of writing.

The conventional character/pattern recognition apparatus, employing only one recognition method, has been associated with following drawbacks:

(1) In case of an erroneous recognition, the reentry of the same character results in the same erroneous recognition, because the manner of writing is same as before; and (2) The apparatus is not convenient for use as it cannot necessarily meet the requirement of the user, for example giving emphasis on a shorter recognition time while the user agrees to enter handwriting in carefully written manner, or emphasis on acceptance for rougher handwriting even if the recognition time becomes longer.

SUMMARY OF THE INVENTION

In consideration of the foregoing, an object of the present invention is to provide a recognition apparatus for characters and patterns, capable of significantly reducing the percentage of re-input required because of erroneous recognition, and properly satisfying the requirement of the user thereby improving the operability of the apparatus.

Another object of the present invention is to provide a pattern recognition apparatus for recognizing a character or a pattern from handwritten information representing a handwriting, comprising input means for entering said handwritten information, selection means for selecting a desired one of plural recognition method for recognizing the handwritten information entered from said input means, recognition means including said plural recognition methods for recognizing said character or pattern according to the result of selection by said selection means, and output means for releasing the result of recognition by said recognition means.

Still another object of the present invention is to provide a pattern recognition apparatus capable of selecting a desired one from plural recognition methods for recognizing the input handwriting of a character or a pattern, and recognizing the character or pattern according to the result of said selection.

BRIEF DESCRIPTION OF THE DRAWINGS

FIG. 2 is an external perspective view of the apparatus of said embodiment;

FIG. 3 is a view showing an example of the recognition dictionary (A) of the said embodiment;

FIGS. 4 and 5 are views showing examples of the recognition dictionary (B) of said embodiment;

FIGS. 6 and 7 are views showing examples of display for the recognition method in said embodiment;

FIG. 10 is a view showing an example of display for re-recognition in another embodiment; and FIG. 11 is a flow chart for re-recognition process in another embodiment.

DETAILED DESCRIPTION OF THE PREFERRED EMBODIMENTS

Now the present invention will be explained in detail by reference to an embodiment thereof shown in the attached drawings.

[Structure (FIGS. 1 and 2)]

Figure 1:
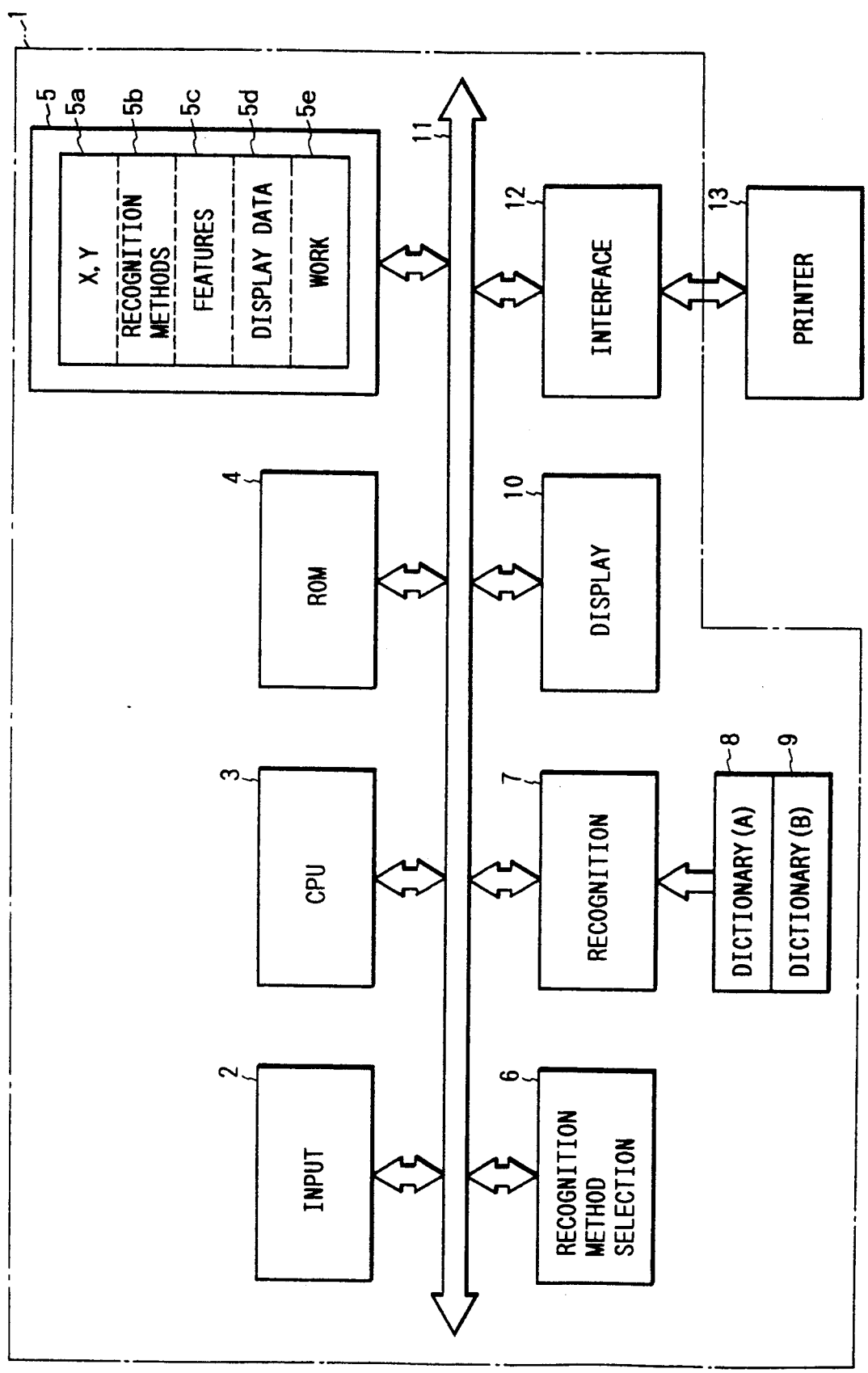
FIG. 1 is a block diagram of a character/pattern recognition apparatus of an embodiment.

FIG. 1 is a block diagram of an embodiment of the recognition apparatus for character and pattern recognition.

Figure 8:
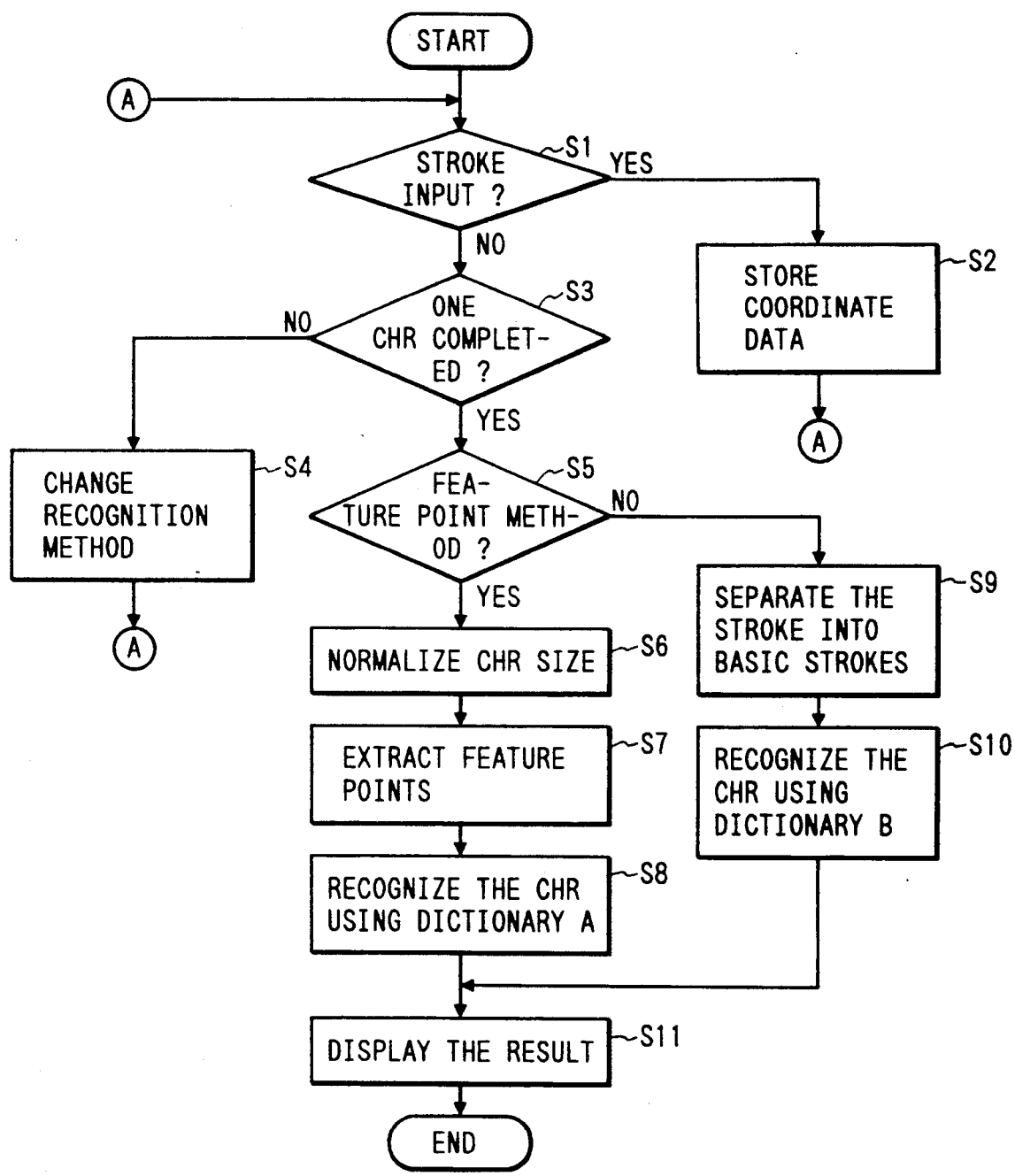
FIG. 8 is a flow chart showing the sequence of processing in said embodiment.
Figure 9:
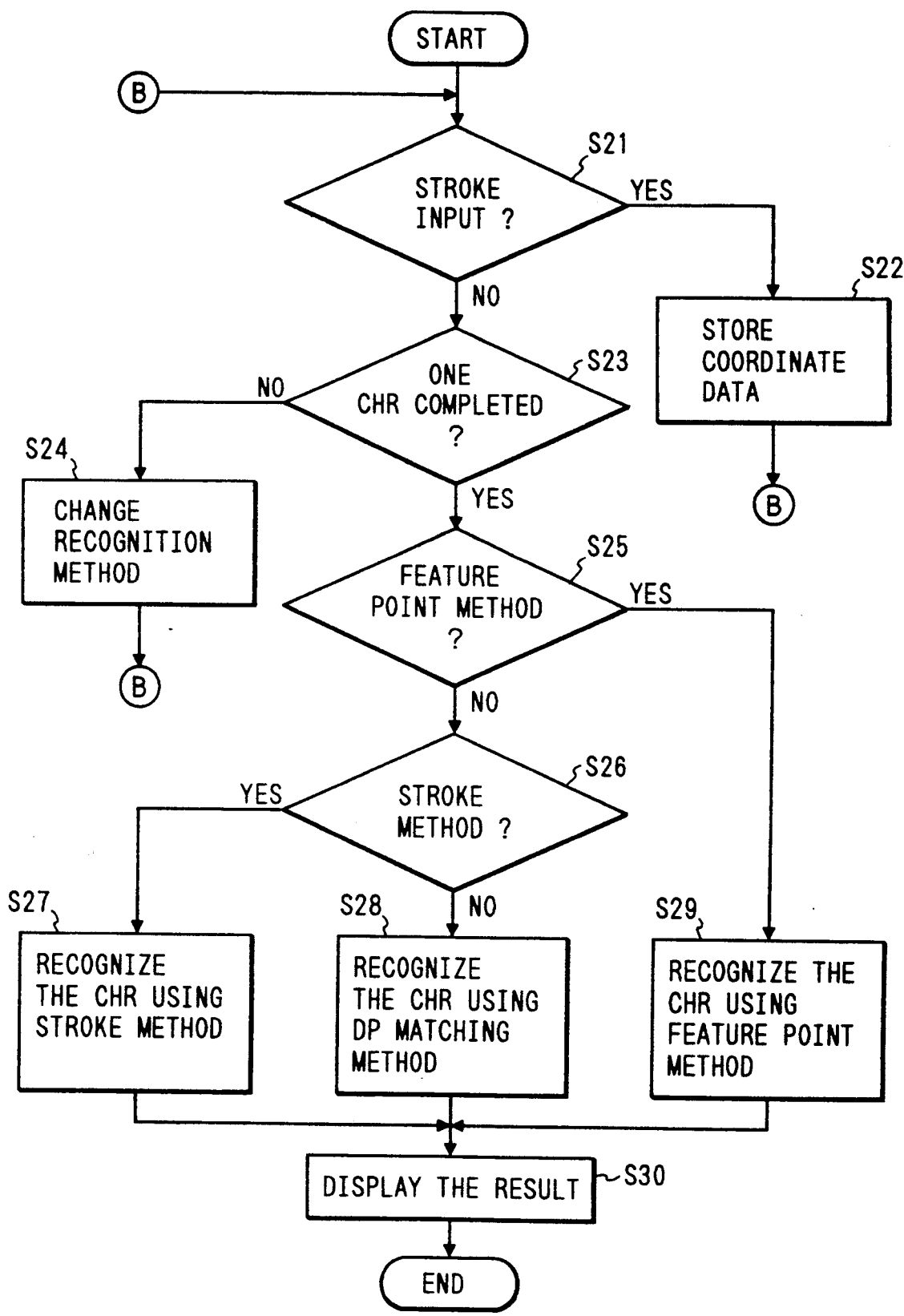
FIG. 9 is a flow chart showing the sequence of processing in another embodiment.

There are shown a main body 1 of the apparatus; an input unit 2 consisting of a tablet and an input pen and adapted to detect the up/down information and x,y-coordinates of the pen point at an interval of 0.02 seconds; a central processing unit (CPU) 3 for controlling the entire apparatus; a ROM 4 for storing a main program, an error program and other programs to be explained later in FIGS. 8 and 9, to be executed by the CPU 3; and a RAM 5 to be used as a work area for various programs stored in the ROM 4, and as a diversion area in an error process.

The RAM 5 includes following memory areas: a coordinate memory 5a for storing the x, y-coordinates of input points obtained from the input unit 2 and the coordinate data after normalization; a recognition method memory 5b for storing the recognition method selected by a recognition method selecting unit 6 to be explained later; a feature memory 5c for storing feature points, such as a start point, end point and sharp point extracted from the coordinates of the input points stored in the coordinate memory 5a, or feature codes such as stroke codes determined from the coordinates of said input points; a display memory 5d for storing display data such as the result of character recognition; and a work area 5e used for example in the character recognition.

There are further provided a recognition method selecting unit 6 for switching the recognition method according to the selection by the user; a recognition unit 7 for effecting the character recognition, or pattern matching, according to the method stored in the recognition method memory 5b and utilizing the data stored in the feature memory 5c; a recognition dictionary (A) 8, to be used by the recognition unit 7, for the feature point pattern matching method, storing character code, total number of strokes, coordinates of feature points etc.; a similar recognition dictionary (B) 9 for the basic stroke method, storing basic stroke codes and features thereof, character code, total number of strokes, basic stroke code group of character etc.; a display unit 10 for displaying the result of recognition and the currently selected recognition method; a bus line 11 for transferring memory addresses and data; and an interface unit 12 for communication with the external output unit such as a printer 13.

Figures 2, 3, 4:
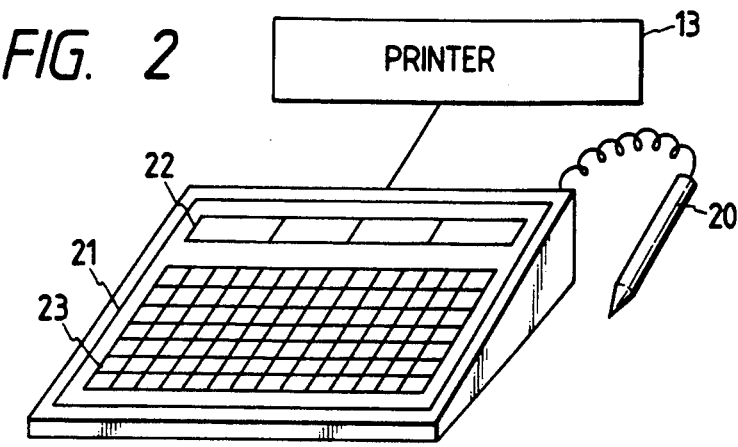

FIG. 2 is an external perspective view of the pattern recognition apparatus of the present embodiment, wherein shown are an input pen 20 connected to the input unit 2; a transparent tablet 21 constituting the input unit 2 and provided thereunder with a liquid crystal display; a menu area 22 to be used for the switching of recognition method or correction or editing of entered characters; and a character input area 23 in which the input with the input pen 20 is to be conducted.

Said menu area 22 and character input area 23 are indicated by the liquid crystal display.

[Explanation of recognition methods (FIGS. 3-7)]

In the following there will be explained the recognition methods employed in the present embodiments, with reference to FIGS. 3 to 7.

FIG. 3 shows a part of character information recorded in the recognition dictionary (A) 8 of the present embodiment. Said information includes number of strokes 31, character code 32, and coordinates 33 of feature points, all for use in the feature point pattern matching method.

FIGS. 4 and 5 show a part of character information recorded in the recognition dictionary (B) 9 of the present embodiment. Said information includes basic stroke code 41, shape 42, number of strokes 51, character code 52, and basic stroke code train 53, all for use in the basic stroke method.

FIGS. 6 and 7 show a part of the menu area 22, displayed in the display unit 10 according to the recognition method stored in the recognition method memory 5b. In these drawings, 60 and 70 indicate the menu area 22. FIG. 6 shows a state in which the feature point pattern matching method is selected, and FIG. 7 shows a state in which the basic stroke method is selected.

[Explanation of processing sequence (FIG. 8)]

Now the process sequence of the present embodiment will be explained in the following, with reference to a flow chart shown in FIG. 8.

At first, when the operator enters a coordinate point into the tablet 21 with the input pen 20, a step S1 discriminates whether said input is made in the menu area 22 or in the character input area 23. If it is in the character input area 23, the sequence proceeds to a step S2 for storing coordinate data, as a stroke constituting a character, into the coordinate memory 5a, and the sequence returns to the step S1. On the other hand, if the input is in the menu area 22, the sequence proceeds to a step S3 for discriminating whether said input indicates the end of input of a character. If not, a step S4 executes a process corresponding to the menu indicated by said input.

For example, if a change of the recognition method is instructed, another recognition method is selected by changing the method displayed on the display unit 10. The selected recognition method is stored in the recognition method memory 5b, and displayed on the display unit 10.

The selection of the recognition method is conducted in the recognition method selecting unit 6, and, in case of no selection (default), the feature point pattern matching method is memorized in the recognition method memory 5b.

On the other hand, if the discrimination in the step S3 indicates the end of input, the sequence proceeds to a step S5 for checking the content of the recognition method memory 5b storing the selected recognition method. Then, if the feature point pattern matching method is selected, a step S6 effects the normalization of size of the input character, based on the coordinate values thereof stored in the coordinate memory 5a, and stores the normalized data in the coordinate memory 5a. Then a step S7 extracts start points, end points, sharp points etc. from said normalized data, and such points as the feature data in the feature memory 5c. Subsequently a step S8 matches the feature points of the input character stored in the feature memory 5c with the coordinates 33 of the feature points stored in the recognition dictionary (A) shown in FIG. 3, and identifies a character with highest similarity as the recognized character. Then a step S11 stores the result of recognition by the recognition unit 8 in the display memory 5d and displays said result on the display unit 10.

On the other hand, if the discrimination in the step S5 identifies that the basic stroke method is selected, the sequence proceeds to a step S9 for classifying each stroke, based on the coordinate data of the input character stored in the coordinate memory 5a, into the basic stroke code 41 stored in the recognition dictionary (B) 9 shown in FIG. 4. Then a step S10 matches the train of basic stroke codes 41 obtained in the above-explained process with the basic stroke code train 53 of the recognition dictionary (B) 9 shown in FIG. 5, thereby determining a character code 52. A step S11 stored the result of recognition in the display memory 5d, and displays it on the display unit 10.

In the present embodiment, the result of recognition is displayed on the display unit 10, but it may be sent also to the printer through the interface unit 12.

As explained in the foregoing, the present embodiment effects the recognition by the feature point pattern matching method in case the user wishes to write in rough manner while a somewhat longer recognition time is tolerable, but adopts the basic stroke method in case the user wishes a shorter recognition time while he tolerates cleaner handwriting, thereby realizing a pattern recognition apparatus meeting the requirement of the user and improving the ease of use.

[Another embodiment]

The foregoing embodiment employs two recognition methods, but there may be employed three or more methods by adding other recognition methods.

In the following another embodiment, employing three recognition methods including the DP matching method, will be explained with reference to a flow chart shown in FIG. 9.

At first, when the operator enters a coordinate point into the tablet 21 with the input pen 20, a step S21 discriminates whether the input is made in the menu area 22 or in the character input area 23. If the input is in the character input area 23, a step S22 stores the coordinate data, as a stroke constituting a character, into the coordinate memory 5a, and the sequence then returns to the step S21. On the other hand, if the discrimination in the step S21 identifies an input in the menu area 22, the sequence proceeds to a step S23 to discriminate whether the input indicates the end of input of a character. If not, a step S24 executes a process corresponding to the entered menu. For example, if a change in the recognition method is entered, there is selected another recognition method by changing the method displayed on the display unit 10. The selected recognition method is memorized in the recognition method memory 5b, and displayed on the display unit 10.

Said selection of the recognition method is conducted by the recognition method selecting unit 6, and, in case of no selection (default), the feature point pattern matching method is stored in the recognition method memory 5b.

On the other hand, if the discrimination in the step S23 identifies the end of input, the sequence proceeds to a step S25 for checking the content of the recognition method memory 5b memorizing the selected recognition method. If the feature point pattern matching method is selected, the sequence proceeds to a step S29 for effecting the character recognition by the feature point pattern matching method explained before. On the other hand, if the basic stroke method is selected, the sequence proceeds from a step S26 to S27 for effecting the character recognition by the basic stroke method explained before. If the step S26 identifies the DP matching method, the sequence proceeds to a step S28 for effecting the character recognition by the DP matching method. After the recognition process in the steps S27–S28, the sequence proceeds to a step S30 for storing the result of recognition in the display memory 5d for display on the display unit 10.

Thus the present embodiment can achieve effects similar to those in the foregoing embodiment.

In the foregoing two embodiments the recognition method is selected prior to the execution of recognition, but it is also possible to select another recognition method, in case of erroneous recognition, to conduct re-recognition. In such case, as shown in FIG. 10, the first recognition for the input character is conducted with a first recognition method 101, and the re-recognition is conducted with a second recognition method 102. FIG. 10 shows a part of the menu area 22 on the display unit 10, indicating that the basic stroke method and the feature point pattern matching method are respectively selected as the first recognition method 101 and the second recognition method 102. For effecting the re-recognition, an area 103 for re-recognition is to be designated.

The above-mentioned process for re-recognition will be explained in the following with reference to a flow chart shown in FIG. 11.

When the operator enters a coordinate point on the tablet 21 with the input pen 20, a step S31 discriminates whether the input is made in the menu area 22 or in the character input area 23. If it is identified as in the character input area 23, a step S32 stores the coordinate data as a stroke constituting a character, in the coordinate memory 5a, and the sequence returns to the step S31. On the other hand, if the discrimination of the step S31 identified the input in the menu area 22, the sequence proceeds to a step S33 for discriminating whether the input indicates the end of input of a character, and, if not, a step S34 executes a process for changing the recognition method.

On the other hand, if the discrimination in the step S33 indicates the end of input of a character, a step S35 executes character recognition, or pattern matching, by the first recognition method stored in the recognition method memory 5b (basic stroke method in the example shown in FIG. 10, and a step S36 displays the result of recognition on the display unit 10. If a step S37 identifies that the operator designates the re-recognition area 103 of the menu area 22 for example because of an erroneous result on the preceding recognition, a step S38 executes the character recognition by the second recognition method (feature point pattern matching method), and a step S39 displays the result on the display unit 10.

As explained in the foregoing, similar effects can be attained also in case of re-recognition.

As explained in detail in the foregoing, the present invention allows the user to significantly reduce the percentage of re-input required due to erroneous recognitions, and to improve the operability by exactly satisfying the requirement of the user.

What is claimed is:

1. A pattern recognition apparatus comprising:
   input means for inputting pattern information and method information designating a recognition method;
   determining means for determining whether input information is the pattern information or method information;
   memory control means for controlling a pattern information memory to store the pattern information when the input information is determined to be the pattern information by said determining means and controlling a method information memory to store the method information when the input information is determined to be the method information by said determining means;
   dictionary means for storing a plurality of dictionaries corresponding to respective different recognition methods;
   analyzing means for analyzing pattern information stored in the pattern information memory in accordance with a recognition method designated by method information stored in the method information memory; and
   recognition means for recognizing the analyzed pattern information using one of the plurality of dictionaries corresponding to the recognition method designated by the stored method information.

2. An apparatus according to claim 1, wherein a different one of said plural recognition methods is used by said dictionary means after the result of said dictionary means using the earlier recognition method is erroneous.

3. A pattern recognition apparatus comprising:

memory means for storing a plurality of different recognition methods including first and second recognition methods;

input means for inputting pattern information;

recognition means for recognizing the input pattern information using the first recognition method;

output means for outputting a recognition result by said recognition means; and instruction means for instructing said recognition means to recognize the input information again in response to the recognition result output by said output means, wherein said recognition means recognizes the input pattern information being recognized again using the second recognition method in response to an instruction from said instruction means.

4. A pattern recognition method applicable to an apparatus having a plurality of dictionaries therein corresponding to respective different recognition methods, said method comprising the step of:

inputting pattern information and method information designating a recognition method;

determining whether input information is the pattern information or the method information;

controlling a pattern information emory to store the pattern information when the input information is determined to be the pattern information in said determining step;

controlling a method information memory to store the method information when the input information is determined to be the method information in said determining step;

analyzing the pattern information stored in the pattern information memory in accordance with a recognition method designated by said method information stored in the method information memory; and recognizing the analyzed pattern information using one of the plurality of dictionaries corresponding to the recognition method designated by the stored method information.

5. A method according to claim 4, wherein a different one of said plural recognition methods is used by said dictionary means after the result of said dictionary means using the earlier recognition method is erroneous.

6. A pattern recognition method, comprising the steps of:

storing a plurality of different recognition methods including first and second recognition methods;

inputting pattern information;

recognizing the input pattern information using the first recognition method;

outputting a recognition result obtained in the recognition step;

giving an instruction to recognize the input pattern information again in response to the recognition result; and recognizing again the input pattern information using the second recognition method in response to an instruction given in the instruction step.

* * * * *